No. 878,003. PATENTED FEB. 4, 1908.
M. JACOBS.
BOLT.
APPLICATION FILED DEC. 26, 1906.
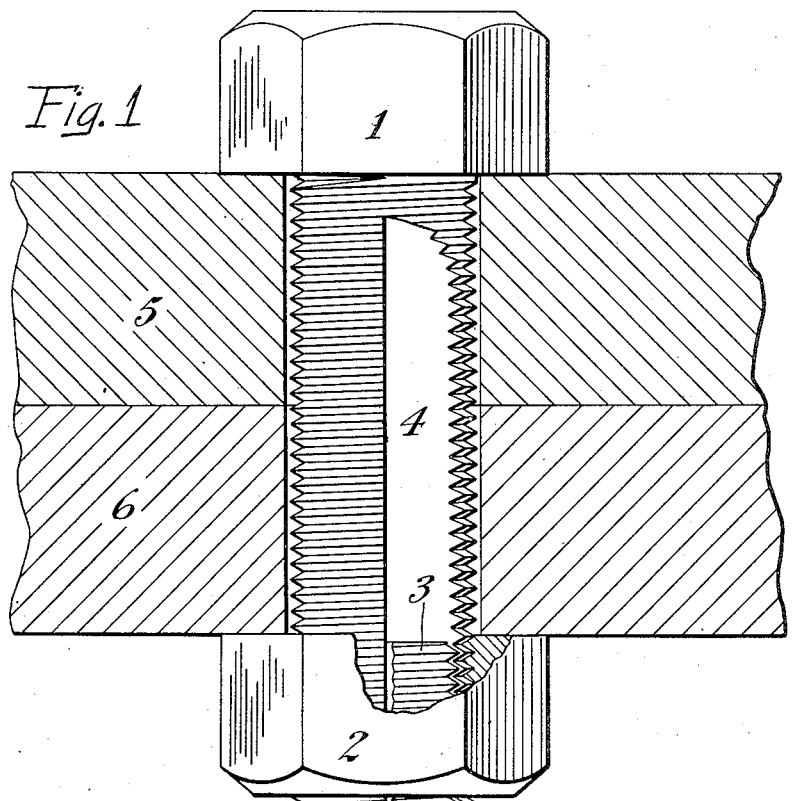
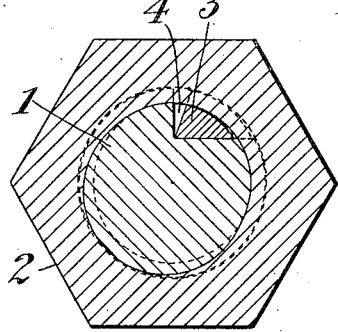
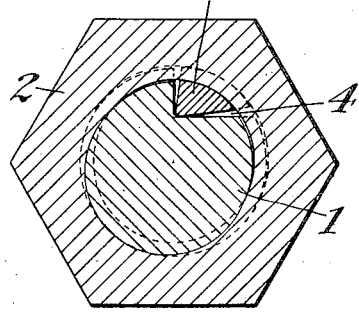
Witnesses:
Wm. Ashley Kelly
Albert V. T. Day
Inventor:
Morris Jacobs
by Henry D. Williams
Atty.

UNITED STATES PATENT OFFICE.

MORRIS JACOBS, OF NEW YORK, N. Y.

BOLT.

No. 878,003.  Specification of Letters Patent.  Patented Feb. 4, 1908.

Application filed December 26, 1906. Serial No. 349,543.

*To all whom it may concern:*

Be it known that I, MORRIS JACOBS, a citizen of the United States, residing at the borough of Brooklyn, city of New York, in the county of Kings and State of New York, have invented certain new and useful Improvements in Bolts, of which the following is a specification, reference being had therein to the accompanying drawing, forming a part thereof.

My invention relates to means for preventing the accidental or unintentional unscrewing of coöperative screw-threaded parts, such as bolts and nuts, by reason of jars or vibrations, such, for example, as are attendant with use on the fish-plates of railroads, locomotives, fire engines, wagons and carriages of all kinds, elevators, electric and other cars, agricultural machinery and automobiles.

My invention has for its objects the effectual locking of the parts, the employment of nuts of ordinary construction, the avoidance of mutilation or injury in locking the parts or by reason of such locking, and the self-tightening of the parts, whereby not only is unintentional unscrewing prevented but also a failure to tightly screw up the parts is corrected and the vibration of use will cause the loose member to tighten itself.

Another object of my invention is the ready intentional unscrewing of the parts when desired without mutilation or injury. Other objects of my invention will appear from the following description.

My invention includes a locking or clutch member carried by the bolt and adapted to rock in a groove therein and provided with a threaded convex locking surface adapted to have locking engagement with the threaded concave surface of the bolt hole in the nut or other threaded part coöperative with the bolt, and my invention includes various improvements in construction hereinafter described.

The embodiment of my invention illustrated in the accompanying drawings will now be particularly described with reference to such drawings, after which I will point out my invention in claims.

Figure 1 is an elevation showing my self-locking bolt and a nut locked thereon and coacting with the bolt in clamping two objects together, the nut being partly in section. Fig. 2 is a cross-section through the bolt, nut and locking cam as viewed from the outer or screw end of the bolt, and shows the locking cam in non-locking position. Fig. 3 is a similar view, but with the locking cam rocked to locking position.

In the embodiment of my invention illustrated in the accompanying drawings a bolt 1 has screwed thereon a nut 2 which is adapted to be locked upon it by a rockable locking bar or cam rocker 3. The nut 2 is an ordinary nut of the proper size to fit the bolt upon which it is screwed.

The bolt 1 is provided with a longitudinal V-shaped groove 4 having plane sides forming a reëntrant angle whose apex lies on a radius of the bolt, and such groove lies wholly at one side of the bolt diameter which coincides with such radius. The groove 4 is preferably of substantially right-angular cross-section, as shown, and is shown as extending substantially throughout the length of the threaded portion of the bolt. The groove 4 has one of its sides substantially radial to the axis of the bolt, but of less depth or width than the length of such radius, being shown as substantially one-half thereof. The other side of the groove is shown as being at right angles to the radial side. Geometrically the elements of the last-named side form halves of chords of which the elements of the other side are the radial perpendiculars. Therefore, this last-named side or bottom of the groove is of greater width than the other side and intersects the periphery or circumference of the bolt at oblique angles. The groove as a whole is inclined to radial lines of the bolt, that is to say, a medial plane or bisector of the angle formed by the two sides of the groove is obliquely inclined to a radial plane extending from the axis of the bolt to the intersection of the planes of the sides of the grooves. Although the two sides of the groove are disposed at right angles to each other, they do not join each other at an angle but are united by a rounded or concave portion as shown.

For a bolt with "right-hand" threads as shown in the drawings, the wider side of the groove when viewed from the screw end of the bolt will extend to the right from the radial narrower side. For a bolt with "left-hand" threads the wider side of the groove would extend to the left of the narrower side when similarly viewed.

The rockable cam or locking bar has two plane faces disposed to each other at an angle substantially less than that of the two converging sides of the groove. These plane faces join in a rounded or convex edge adapted to pivotally seat or fulcrum in the correspondingly rounded or concave bottom of the groove. The cam is adapted to rock in the groove upon this rounded edge or fulcrum edge which receives the locking thrust. When the cam is in non-locking position it reposes with its corresponding or adjacent and wider plane face in contact with the wider surface or side of the groove, as shown in Fig. 2. The cam has a transversely curved outer or circumferential face, the curvature of which is preferably about the same as that of the bolt, and is shown as the same. This circumferential face of the cam is provided with threads corresponding to and forming virtual continuations of the threads of the bolt. These threads on the cams are adapted to be frictionally engaged by the threads of the nut to move the cam into or out of locking position and to so maintain it.

It is evident from the above description and from the drawings that if the nut be rotated relatively to the bolt to screw it up, the cam will be moved by such frictional engagement to assume its inactive or non-locking position and the nut will run freely over the cam with but slightly greater friction than if such cam were not present or substantially as it would over an ordinary bolt. Should the nut have a tendency to rotate in the opposite direction, such as would unscrew it from the bolt, the friction of the coacting threads will rock the cam to a locking engagement with the nut. The narrower side of the groove acts as a shoulder against which the fulcrum-edge of the cam-rocker abuts, the cam-rocker rocking or rotating about such fulcrum-edge as an axis. The reason such locking engagement takes place is not only because the cam rotates about an axis eccentric to the axis of the bolt but also because of the shape of the cam, which causes an extended surface to move outward as the cam rotates. Thus the circumferentially curved cam face is thrust outward into contact with the nut when the cam is rocked in one direction and is drawn inward away therefrom when rocked in the opposite direction. It is to be noted that, as shown in Fig. 3, the curved cam face grips substantially throughout its entire width upon the nut.

When the cam assumes a locking position the clearance between the nut and the bolt is taken up thereby and the nut and bolt are forced to a slightly eccentric relation, the extent of which depends upon the amount of clearance. As the two interlocking surfaces curve in the same direction a firm grip is secured over an extended surface and the threads of the nut are not marred by any sharp corners or limited contact surfaces. In the case of V-shaped threads as shown, the locking effect is enhanced by their wedge-like action.

The locking cam 3 is as shown of about the length of the thickness of the nut in connection with which it is used, and may be placed at various locations along the groove 4 to correspond with the location of the nut when screwed home. The cam is always placed so as to be not quite flush with the back of the nut when the nut is screwed down to its limit, thus assuring that the cam be not disarranged or disengaged by coming in contact with whatever objects the bolt may pass through. This is clearly shown in Fig. 1, wherein two objects 5 and 6 are shown as clamped together by the bolt and nut. The cam is retained in place or prevented from dropping out by the interlocking of its threads with the threads of the nut.

Any jar or vibration to which this self-locking bolt may be subjected incident to its use will have the effect to tighten or maintain tight the nut thereon. In fact it has been found that if a nut be left partly unscrewed it will tighten up of its own accord when subjected to vibration. Vibration can move it only in the direction of tightening and will move it in that direction only, and the parts will roll together and repeated vibrations will tighten the nut and will thus correct the error of a careless workman who neglected to tighten it. The nut is therefore not only self-locking but also self-tightening.

If at any time it is desired to unscrew the nut, the cam 3 may be forcibly rocked to non-locking position by any suitable tool or by slightly tightening the nut and may be held in such position by any suitable means, as, for example, by the insertion of a wooden toothpick, and so held until the nut has been unscrewed beyond the locking cam. No injury or mutilation of the nut need be effected in locking or unlocking the parts.

The terms "nut" and "bolt" have been used for convenience in the above description and in the following claims to designate two coöperative threaded parts.

It is obvious that modifications may be made in the construction shown and above particularly described within the principle and scope of my invention.

I claim:—

1. The combination of a screw-threaded bolt having therein a V-shaped longitudinal groove the apex line of whose reëntrant angle lies on a radial plane of the bolt and such groove lying wholly at one side of a diametrical plane of the bolt coinciding with such radial plane, one of the sides of such groove being substantially wider than the other, a screw-threaded cam-rocker of less arc than the groove so as to be rockable therein and having two adjacent plane faces joined in a fulcrum-edge adapted to pivotally seat in the bottom of the groove, the narrower side of the groove forming an abutment to prevent the rocker from slipping as it moves to locking position, one of the faces of the locker being substantially wider than the other, such wider face lying in contact with the wider side of the groove in the unlocked position of the rocker and being angularly spaced therefrom in the locking position, and a screw-threaded nut coöperative with the bolt and rocker, the rocker being adapted to have its screw threads frictionally engaged by the screw threads of the nut to rock the rocker upon its fulcrum-edge.

2. The combination of a screw-threaded bolt having therein a V-shaped longitudinal groove extending substantially the length of the threaded portion thereof and the apex line of whose reëntrant angle lies on a radial plane of the bolt and such groove lying wholly at one side of a diametrical plane of the bolt coinciding with such radial plane, one of the sides of such groove being substantially wider than the other, a screw-threaded cam-rocker of less arc than the groove and less of length than the groove and placeable at different locations therealong and having two adjacent plane faces one of which is substantially wider than the other, such wider face lying in contact with the wider side of the groove in the unlocked position of the rocker and being angularly spaced therefrom in the locking position, and a screw-threaded nut coöperative with the bolt and rocker in the various locations of the rocker.

3. The combination of a screw-threaded bolt provided with a longitudinal groove having plane sides forming a reëntrant non-obtuse angle whose apex lies on a radius of the bolt and such groove lying wholly at one side of the bolt diameter which coincides with such radius, one of the sides of such groove being substantially wider than the other and substantially wider than the shortest distance from the apex of the angle to the circumferential line of the bolt, a screw-threaded cam-rocker of less arc than the groove so as to be rockable therein and having two adjacent plane faces at an acute angle to each other and joined in a fulcrum-edge adapted to pivotally seat in the bottom of the groove, the narrower side of the groove forming a shoulder against which the fulcrum-edge of the rocker abuts as the rocker rocks to locking position, one of the faces of the rocker being substantially wider than the other and of a width substantially greater than the shortest distance between the apex of the above-named reëntrant angle and the circumferential line of the bolt, the wider face of the rocker being adjacent to the wider side of the groove and in contact therewith in the unlocked position of the rocker and angularly spaced therefrom in the locking position, and a screw-threaded nut coöperative with the bolt and rocker, the rocker being adapted to have its screw threads frictionally engaged by the screw threads of the nut to rock the rocker upon its fulcrum-edge.

4. The combination of a screw-threaded bolt provided with a longitudinal groove extending substantially the length of the threaded portion thereof and having plane sides forming a reëntrant non-obtuse angle, such sides being united to each other by a concave groove-portion, one of such sides being substantially wider than the shortest distance from the greatest depth of the groove to the circumferential line of the bolt and the other of such sides being of a width equal to such distance, a screw-threaded cam-rocker having two adjacent plane faces at an acute angle to each other and joined in a convex edge adapted to pivotally seat in the correspondingly concave bottom of the groove, such rocker being of less arc than the groove so as to be rockable therein and of less length than the groove so as to be placeable at different locations therealong and having one of its faces substantially wider than the shortest distance from the greatest depth of the groove to the circumferential line of the bolt and having its other face of a width not less than such shortest distance, the wider face of the rocker being adjacent to the wider side of the groove and in contact therewith in the unlocked position of the rocker and angularly spaced therefrom in the locking position, and a screw-threaded nut coöperative with the bolt and rocker.

5. The combination of a screw-threaded bolt having therein a V-shaped longitudinal groove extending substantially the length of the threaded portion thereof, a screw-threaded cam-rocker of less arc than the groove so as to be rockable therein and having two adjacent plane faces joined in a fulcrum-edge adapted to pivotally seat in the bottom of the groove, one side of the groove forming a shoulder against which the fulcrum-edge of the rocker abuts as the rocker rocks to locking position, the rocker being of less length than the groove and placeable at different locations therealong, and a screw-threaded nut coöperative with the bolt and rocker in the different locations of the rocker, the rocker being adapted to have its screw threads frictionally engaged by the screw threads of the nut to rock the rocker upon its fulcrum edge.

In testimony whereof I have affixed my signature in presence of two witnesses.

MORRIS JACOBS.

Witnesses:
WM. ASHLEY KELLY,
BERNARD COWEN.